2,871,122

FEEDSTUFFS FORTIFIED WITH BACITRACIN AND VITAMIN $B_{12}$

Walther H. Ott, Westfield, N. J., assignor, by mesne assignments, to Merck & Co., Inc., Rahway, N. J., a corporation of New Jersey No Drawing. Application October 31, 1950
Serial No. 193,295

7 Claims. (Cl. 99—2)

This invention is concerned generally with improved animal feeds containing novel growth-promoting factors. More particularly, it relates to animal feeds supplemented with bacitracin as a growth-promoting factor and with the method of accelerating the growth of animals by administration of feedstuffs containing this novel growth-promoting factor.

It is known that, in addition to the usual nutrients and vitamins required in the diet of animals, it is necessary to include a sufficient quantity of an unknown factor identified as the "animal protein factor" in order to promote maximum growth. Various complex substances such as meat scraps, fish meal and fish solubles containing this unknown protein factor in varying amounts have been used to supplement animal diets. More recently it has been found that vitamin $B_{12}$ and related vitamin $B_{12}$-like compounds have animal protein factor activity, and can be used as feed supplements in place of these complex substances. It was previously thought that, when animals were fed a diet complete with respect to the usual nutrients and vitamins, and also containing an adequate amount of the "animal protein factor," the growth of said animals was the maximum obtainable with the strain of animals under the conditions employed.

It is now discovered that it is possible to achieve remarkable and unexpected acceleration in the growth rate of animals superior to that obtainable with the complete diet described in the preceding paragraph, by incorporating in said diet a relatively small amount of bacitracin. When bacitracin is added to an otherwise nutritionally-adequate diet, I have found that animals fed the bacitracin-supplemented diet gain weight more rapidly than animals fed the same diet without the added bacitracin component. Thus, this growth-promoting effect, resulting from the incorporation of bacitracin in the animal diet, is obtained when the bacitracin is added to a nutritionally-adequate, APF-supplemented feedstuff (as for example an animal feed containing all known nutrients and, as a source of animal protein factor, vitamin $B_{12}$ and/or fish meal).

Although the bacitracin can be added to the animal diet in a number of ways, it is presently preferred to incorporate the bacitracin directly in the feedstuff. Alternatively, the bacitracin can be administered to the animals separately, as for example, in a supplementary feed or in the drinking water.

If desired, purified bacitracin can be added to the animal diet. It is ordinarily preferred to utilize the bacitracin in the form of a concentrate or adsorbate prepared from *B. subtilis* Tracy fermentation broths. For example, bacitracin can be adsorbed from the broth by various agents such as fullers earth and carbon and the resulting dried adsorbate can then be added to the feed in the desired amounts. Alternatively, the filtered broth can be evaporated to dryness and incorporated in the animal diet in this form.

While the exact function of bacitracin in animal nutrition is not understood, it is postulated that bacitracin alters the intestinal flora of the animal, and favors the growth of certain types of microorganisms which produce larger amounts of the growth-promoting factor or factors. Of course, this may not be the correct explanation for the action of the bacitracin in the diet, and I do not wish to be bound by such theoretical considerations, however likely these may be.

As indicated previously, in one embodiment of my invention, it is preferred to incorporate bacitracin directly in the feedstuff containing the animal protein factor. Any suitable method for dispersing the material uniformly throughout the feed mixture can be used. The amount of bacitracin added to the animal diet may be varied in order to achieve the beneficial results of my invention. It is ordinarily found that an amount within the range of about 1 to 100 mgs. per kg. of feedstuff promotes the maximum growth in animals fed the bacitracin-supplemented diet. While a remarkable acceleration of the growth rate is obtained at these various levels of bacitracin supplementation, I ordinarily prefer to utilize about 10 to 15 mgs. of bacitracin per kg. of feedstuff, since I have found that a feedstuff containing this amount of bacitracin, when utilized as an animal feed, will result in an optimum growth rate under desirable conditions.

I have further found that the inclusion of bacitracin is particularly valuable when vitamin $B_{12}$ and/or vitamin $B_{12}$-like compounds are employed as a source of the animal protein factor in feedstuffs. For example, using diets supplemented with vitamin $B_{12}$ and bacitracin, I have been able to show that it is possible to obtain a weight increase between 10 and 15% greater than the weight gained by chicks on the same diet without the added bacitracin component.

Feedstuffs supplemented with bacitracin are particularly suitable for the commercial growing of poultry. By utilizing such supplemented diets it is possible to greatly accelerate the rate at which poultry such as chickens, turkeys and ducks are brought to marketable weight. This is of economic importance to the poultry raiser since it enables him to increase the capacity of his equipment. Another advantage of my supplemented diets is that the added antibacterial agent is efficacious in preventing or checking diseases in poultry or other animals.

The following examples illustrate methods of carrying out the present invention, but it is to be understood that these examples are given for purposes of illustration and not of limitation.

EXAMPLE 1

Day-old chicks used in these tests were hatched from eggs produced by hens fed the following ration, which contains no animal protein supplement and which is low in vitamin $B_{12}$ content:

*Hen Diet No. 1*

| | Parts |
|---|---|
| Yellow corn meal | 48.5 |
| Soybean meal | 20.0 |
| Wheat middlings | 20.0 |
| Alfalfa meal | 5.0 |
| Steamed bone meal | 3.0 |
| Ground limestone | 3.0 |
| Sodium chloride | 0.5 |
| "Viadex" (5000 units vitamin A and 1000 units vitamin D per gram) | 0.22 |
| Riboflavin | 0.001 |

(These parts are by weight)

The day-old chicks were placed in electrically-heated metal battery brooders and fed the following practical all-vegetable, vitamin $B_{12}$-deficient diet for a preliminary period of three days:

Chick Diet No. C-5

|  | Parts |
|---|---|
| Yellow corn meal | 63.3 |
| Soybean meal | 30.0 |
| Alfalfa meal | 2.0 |
| Bone ash | 2.0 |
| Calcium carbonate | 1.5 |
| Sodium chloride | 0.5 |
| Choline chloride dry mix (25% choline chloride) | 0.4 |
| "Viadex" | 0.2 |
| Manganese sulfate | 0.02 |
| Inositol | 0.05 |
| p-Aminobenzoic acid | 0.015 |
| Niacin | 0.002 |
| Calcium pantothenate | 0.0015 |
| Pyridoxine | 0.0005 |
| Riboflavin | 0.0005 |
| Thiamine | 0.00025 |
| 2-methyl naphthoquinone | 0.00005 |
| Biotin | 0.0000125 |

(These parts are by weight)

At the end of the preliminary period, the chicks were wing-banded for identification and distributed into three groups of 10 chicks each balanced in regard to individual body weights, as well as average body weights. Each of the three groups of chicks was placed on an experimental diet which consisted of diet C-5 supplemented, per kg. of diet, with 500 mg. of an APF concentrate having APF activity equivalent to 41 micrograms of vitamin $B_{12}$ per gram. The experimental diets fed two of the three groups of chicks were further supplemented with the indicated amount of bacitracin. Data on the experimental diets and the growth results at the end of 19 days on said diets are as follows:

| Experiment No | 381D-1 | 381D-3 | 381D-4 |
|---|---|---|---|
| Basal diet | C-5 | C-5 | C-5 |
| Mg. APF Supplement added per kg. diet (500 mg. supplement equivalent to 20γ of vitamin $B_{12}$ activity) | 500 | 500 | 500 |
| Mg. bacitracin added per kg. diet | None | 16.5 | 33 |
| No. of chicks tested | 10 | 10 | 10 |
| Sex of chicks | M | M | M |
| Average initial chick weight, gm | 51.5 | 51.6 | 51.5 |
| Mean gain in weight: |  |  |  |
| Gm./chick/day | 5.91 | 6.86 | 6.21 |
| Percent extra gain | -------- | 16 | 5 |

It will be noted that the mean daily gain in weight of chicks fed the basal diet C-5 supplemented with bacitracin (Experiment Nos. 381D-3 and 381D-4) was approximately 5-15% greater than the mean daily gain in weight of chicks fed the unsupplemented basal diet (Experiment 381D-1).

EXAMPLE 2

In another series of experiments with chicks, which were run substantially in accordance with the procedure described in Example 1, day-old chicks were fed diet C-5 for a preliminary period of two days and then distributed into four groups of 10 chicks each balanced in regard to individual body weights as well as average body weights.

Each of the four groups of chicks was then placed on a diet which consisted of the basal diet C-5 supplemented, per kg. of diet, with 2 grams of an APF concentrate having APF activity equivalent to 41 micrograms of vitamin $B_{12}$ per gram. The experimental diets fed three of the four groups of chicks were further supplemented with the indicated amount of bacitracin. Data on the experimental diets and the growth results at the end of 19 days on said diets are as follows:

| Experiment No | 388B-1 | 388B-2 | 388B-3 | 388B-4 |
|---|---|---|---|---|
| Basal diet | C-5 | C-5 | C-5 | C-5 |
| Mg. APF supplement added per kg. diet (2000 mg. supplement equivalent to 82γ of vitamin $B_{12}$ activity) | 2,000 | 2,000 | 2,000 | 2,000 |
| Mg. bacitracin added per kg. diet | None | 5.5 | 16.5 | 33 |
| No. of chicks tested | 20 | 10 | 10 | 10 |
| Sex of chicks | F | F | F | F |
| Average initial chick weight, gm | 44.3 | 44.3 | 44.4 | 44.3 |
| Mean gain in weight: |  |  |  |  |
| Gm./chick/day | 5.82 | 6.26 | 6.96 | 6.36 |
| Percent extra gain | -------- | 8 | 20 | 9 |

Current knowledge of chick nutrition indicates that the vitamin $B_{12}$-supplemented diet used in Experiment No. 388B-1 should supply all known nutrients required by the chick. Hitherto, the growth obtainable with such a diet has been regarded as the maximum obtainable with the strain of chicks and the conditions employed.

It will be noted that the mean daily gain in weight of chicks fed the bacitracin-supplemented diets used in Experiments Nos. 388B-2, 388B-3 and 388B-4 was, however, approximately 10-20% greater than the mean daily gain in weight of chicks fed the identical diet minus the bacitracin component.

EXAMPLE 3

In another series of experiments with chicks, which were run substantially in accordance with the procedure described in Example 1, day-old male chicks were fed diet C-5 for a preliminary period of two days and then distributed into eight groups of 10 chicks each balanced in regard to individual body weights as well as average body weights. (Average initial chick weight in each group = 47.1 g.)

Two groups of chicks (total number 20 chicks) were selected as controls and were placed on a diet which consisted of the basal diet C-5 supplemented with 20 micrograms of vitamin $B_{12}$ per kg. of diet. Each of the other six groups of chicks was likewise placed on a diet consisting of diet C-5 supplemented with 20 micrograms of vitamin $B_{12}$ but containing, in addition, bacitracin. Data on the experimental diets and the growth results at the end of 19 days on said diets are as follows:

| Experiment No. | No. Chicks Tested | Mg. Bacitracin Added per Kg. Diet | Mean Gain in Weight | |
|---|---|---|---|---|
|  |  |  | Gm./Chick/Day | Percent Extra Gain |
| 1 (Control) | 20 | None | 6.12 | -------- |
| 2 | 10 | 2.5 | 6.38 | 4 |
| 3 | 10 | 5.0 | 6.39 | 4 |
| 4 | 10 | 10 | 6.82 | 11 |
| 5 | 10 | 16.5 | 6.79 | 11 |
| 6 | 10 | 33 | 6.58 | 7 |
| 7 | 10 | 40 | 6.55 | 7 |

Current knowledge of chick nutrition indicates that the vitamin $B_{12}$-supplemented diet used in Experiment No. 1 (Control) should supply all known nutrients required by the chick. Hitherto, the growth obtainable with such a diet has been regarded as the maximum obtainable with the strain of chicks and the conditions employed.

It will be noted that the mean daily gain in weight of chicks fed the bacitracin-supplemented diets used in Experiment Nos. 2 to 7 was, however, approximately 5-10% greater than the mean daily gain in weight of chicks fed the identical diet minus the bacitracin component.

Various changes and modifications may be made in carrying out the present invention without departing from the spirit and scope thereof. Insofar as these changes and modifications are within the purview of the annexed claims they are to be considered as part of my invention.

I claim:

1. An improved animal feedstuff for accelerating the growth of animals which comprises a feedstuff, nutritionally adequate per se, having bacitracin dispersed therein as an active growth-promoting ingredient, said bacitracin being present in an amount within the range of 1 to 100 mgs. per kg. of feedstuff.

2. An improved animal feedstuff for accelerating the growth of animals which comprises a feedstuff, nutritionally adequate per se, having dispersed therein added vitamin $B_{12}$ and bacitracin as an active growth-promoting ingredient, said bacitracin being present in an amount within the range of 1 to 100 mgs. per kg. of feedstuff.

3. An improved poultry feedstuff for accelerating the growth of fowl which comprises a poultry feed, nutritionally adequate per se, having bacitracin dispersed therein as an active growth-promoting ingredient, said bacitracin being present in an amount within the range of 1 to 100 mgs. per kg. of feedstuff.

4. An improved poultry feedstuff for accelerating the growth of poultry which comprises a solid poultry feedstuff nutritionally adequate per se, having bacitracin dispersed therein as an active growth-promoting ingredient, said bacitracin being present in an amount within the range of approximately 10 to 15 mgs. of bacitracin per kg. of feedstuff.

5. An improved feedstuff for accelerating the growth of chicks comprising a predominantly vegetable solid chick feed, nutritionally adequate per se, having dispersed therein as an active growth-promoting ingredient, bacitracin in an amount within the range of approximately 10 to 15 mgs. of bacitracin per kg. of feedstuff.

6. An improved animal feedstuff for accelerating the growth of animals which comprises a feedstuff, nutritionally adequate per se, having dispersed therein a bacitracin-active growth-promoting ingredient, said bacitracin being present in an amount equivalent to 1 to 100 mg. of pure bacitracin per kg. of feedstuff.

7. A bacitracin-active composition, adapted for enhancing the growth-accelerating activity of animal feedstuffs, nutritionally adequate per se, by incorporation therein at a level of 1 to 100 mg. of bacitracin per kg. of feedstuff, which comprises bacitracin-active ingredient admixed with solid pharmacologically-acceptable feed additive in proportion equivalent to 2 to .70 g. of pure bacitracin per kg.

References Cited in the file of this patent

UNITED STATES PATENTS

| | | |
|---|---|---|
| 2,498,165 | Johnson et al. | Feb. 21, 1950 |
| 2,619,420 | Jukes | Nov. 25, 1952 |

OTHER REFERENCES

Moore et al.: Jour. Biol. Chem., vol. 165, No. 2, 1946, pp. 437–441.

Rickes: Science 108, December 3, 1948, pp. 634–635.

The Chemical Age, LXII, 1600, March 11, 1950, pp. 359–360.

Groschke et al.: Poultry Science 29, 4, July 1950, pp. 616–618.

Science News Letter for August 25, 1951, page 114.

Braude et al.: Antibiotics and Chemotherapy, 3, 3, March 1953, page 273.

Harned et al.: Ann. N. Y. Acad. Sci., vol. 51, art. 2, November 30, 1948, page 193.